United States Patent
Schilling (10) Patent No.: US 8,366,118 B2
(45) Date of Patent: Feb. 5, 2013

(54) RETENTION SYSTEM FOR AN INFLATABLE SEAL

(75) Inventor: Robert J. Schilling, Port Saint Lucie, FL (US)

(73) Assignee: Clear View Enclosures, Inc., Cupertino, CA (US)

( * ) Notice: Subject to any disclaimer, the term of this patent is extended or adjusted under 35 U.S.C. 154(b) by 1183 days.

(21) Appl. No.: 12/138,148

(22) Filed: Jun. 12, 2008

(65) Prior Publication Data
US 2009/0309309 A1    Dec. 17, 2009

(51) Int. Cl.
*F16J 15/02* (2006.01)
*F16J 15/14* (2006.01)

(52) U.S. Cl. .................................. 277/646; 277/645

(58) Field of Classification Search .............. 277/331, 277/333, 334, 583, 605, 644, 645, 646
See application file for complete search history.

(56) References Cited

U.S. PATENT DOCUMENTS

| | | | |
|---|---|---|---|
| 2,310,309 A * | 2/1943 | Orr ................................ | 137/580 |
| 2,843,349 A * | 7/1958 | Meyer ........................... | 277/324 |
| 3,984,942 A * | 10/1976 | Schroth ......................... | 49/477.1 |
| 4,363,380 A | 12/1982 | Rued et al. | |
| 4,375,104 A * | 2/1983 | Starr et al. .................... | 376/203 |
| 4,683,988 A | 8/1987 | Shrum, Jr. | |
| 4,786,032 A | 11/1988 | Garman | |
| 5,476,050 A | 12/1995 | Zimmer et al. | |
| 5,934,414 A | 8/1999 | Staczek | |
| 6,031,180 A | 2/2000 | Schilling et al. | |
| 6,182,796 B1 | 2/2001 | Perlstein et al. | |
| 6,296,006 B1 * | 10/2001 | Wegner ......................... | 137/15.11 |
| 6,783,198 B2 | 8/2004 | Rudd et al. | |
| 6,883,641 B2 | 4/2005 | Julien | |
| 7,033,066 B2 | 4/2006 | Helder | |
| 7,178,810 B1 * | 2/2007 | Kuhary .......................... | 277/646 |
| 7,645,105 B2 * | 1/2010 | Hengel et al. ................. | 411/171 |
| 2003/0213653 A1 | 11/2003 | Morris | |
| 2006/0180403 A1 | 8/2006 | Hanlon | |

FOREIGN PATENT DOCUMENTS

JP    2000034097 A    2/2000

OTHER PUBLICATIONS

Presray Pneuma-Seal: Retention Systems http://www.pneuma-seal.com/retention/index.htm (1 page), Apr. 22, 2008.
Presray Pneuma-Seal: Retention Systems Type 1 http:\\www.pneuma-seal.com/retention/ret1.htm (2 pages), Oct. 31, 2008.
Pure Gas Products—Compressed Air Dryers http://www.puregasproducts.com/cad.htm (1 page), Apr. 22, 2008.
Puregas, LLC P550W Series (1 page), www.puregas.com, Nov. 21, 2008.
Pentras Air 500 air dryer document (1 page), Nov. 21, 2008.

* cited by examiner

*Primary Examiner* — Gilbert Lee
(74) *Attorney, Agent, or Firm* — Brian B. Shaw, Esq.; Jodi A. Reynolds, Esq.; Harter Secrest & Emery LLP (57) ABSTRACT

An apparatus and method for retaining an inflatable seal comprising a channel having a closed end and a pair of projecting legs. A plurality of spaced apertures in each of the projecting legs extend parallely along a longitudinal axis of the channel. A plurality of nuts align with the corresponding plurality of spaced apertures and an inflatable seal is disposed within the channel. A pin is disposed within each aperture, wherein each of the pins has a threaded portion threadingly engaging one of the nuts and a non-threaded portion projecting towards the neck to dispose the foot intermediate the pins and the closed end.

24 Claims, 8 Drawing Sheets

RETENTION SYSTEM FOR AN INFLATABLE SEAL

CROSS-REFERENCE TO RELATED APPLICATIONS

None.

STATEMENT REGARDING FEDERALLY SPONSORED RESEARCH OR DEVELOPMENT

None.

REFERENCE TO A "SEQUENCE LISTING"

None.

TECHNICAL FIELD

The present invention relates to a retention system for seals and more particularly, to an inflatable seal retained within a channel.

BACKGROUND OF THE INVENTION

Seal assemblies retained within a channel are used for a number of applications, including but not limited to sealing openings within buildings, containers, and vehicles. Underground enclosures providing selective access to cables and electronic equipment secured therein, for example, include a cover disposed within an opening in an enclosure housing that requires a seal assembly. Preferably, the seal assembly tolerates a variety of environmental conditions. Further, the seal assembly needs to provide enhanced resistance to environmental penetration. Because of the complex designs of the systems for retaining the seals, the retention systems are expensive to fabricate. Further, the seal assemblies are difficult and time consuming to install. Replacing a worn or punctured seal is also difficult and time consuming.

Therefore, a need exists for a seal assembly requiring reduced installation time and complexity, thereby reducing installation costs. A seal that can be removed from the retention system and replaced is also needed. Further, a seal retention system that is simple to manufacture, and therefore, less expensive to fabricate, is needed.

SUMMARY OF THE INVENTION

The present retention system for an inflatable seal incorporates a channel of uniform thickness that is inexpensive to manufacture. Pins disposed adjacent to a foot of the seal retain the seal in a secured position within the channel, and one set of pins is removeable for replacing a worn or punctured seal.

In one configuration, the apparatus for retaining a seal comprises a channel having a closed end and a pair of projecting legs. Each of the projecting legs includes a plurality of spaced apertures extending parallely along a longitudinal axis. A plurality of nuts is aligned with the corresponding plurality of spaced apertures and pins are disposed within each aperture of one of the projecting legs. A seal is disposed within the channel. The seal includes an inflatable bulb, a foot and a neck intermediate the foot and the bulb. A pin is then disposed within each aperture of the other projecting leg, wherein each of the pins has a threaded portion threadingly engaging one of the nuts and a non-threaded portion projecting towards the neck to dispose the foot intermediate the pins and the closed end.

In a further configuration, the apparatus for retaining an inflatable seal comprises a rolled sheet metal piece forming a channel for receiving the inflatable seal, the channel including a closed end and a pair of projecting legs disposed parallel to each other, wherein each projecting leg includes a plurality of spaced apertures. The apparatus further includes a plurality of nuts, each having a tab and a threaded opening, wherein each of the tabs is welded to an inner surface of the projecting legs and wherein each of the threaded openings is aligned with the corresponding plurality of spaced apertures. A seal is disposed within the channel, the seal having an inflatable bulb, a foot and a neck intermediate the foot and the bulb. A spacer is disposed between the closed end of the channel and the foot of the seal, and a pin is disposed within each of the spaced apertures along the projecting legs. Each pin includes a threaded portion and a non-threaded portion, wherein the threaded portion of each pin threadingly engages one of the plurality of nuts, wherein the non-threaded portion of each pin projects towards the neck to dispose the foot intermediate the pins and the closed end, and wherein the non-threaded portion of each pin is spaced from the neck of the seal.

The present invention also includes a method of retaining a seal by forming a channel having a closed end and a pair of projecting legs for receiving a seal. A plurality of spaced apertures are formed in each of the projecting legs along a longitudinal axis of the channel, wherein each of the plurality of spaced apertures of one of the projecting legs align with one of the plurality of spaced apertures of the other one of the projecting legs. A first set of pins is inserted into each of the plurality of spaced apertures of one of the projecting legs. Each of the pins has a threaded portion and a non-threaded portion, wherein the threaded portion of the first set of pins threadingly engage the first set of nuts. The seal, having a foot, an inflatable bulb and a neck, is inserted into the channel by aligning a portion of the neck with the non-threaded portions of the first set of pins inserted into the plurality of spaced apertures of one of the projecting legs. Then, a second set of pins is inserted into each of the plurality of spaced apertures of the other one of the projecting legs, each of the second set of pins having a threaded portion and a non-threaded portion. The threaded portion of the second set of pins is threadingly engaged with a second set of nuts. The non-threaded portion of each of the first and second sets of pins is positioned towards the neck to dispose the foot intermediate the first and second sets of pins and the closed end.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiment, it is understood that the invention is not limited to the disclosed embodiment.

Furthermore, it is understood that the invention is not limited to the particular methodology, materials, and modifications described and as such may vary. It is also understood that the terminology used herein is for the purpose of describing particular elements only, and is not intended to limit the scope of the present invention, which is limited only by the appended claims.

Figure 1:
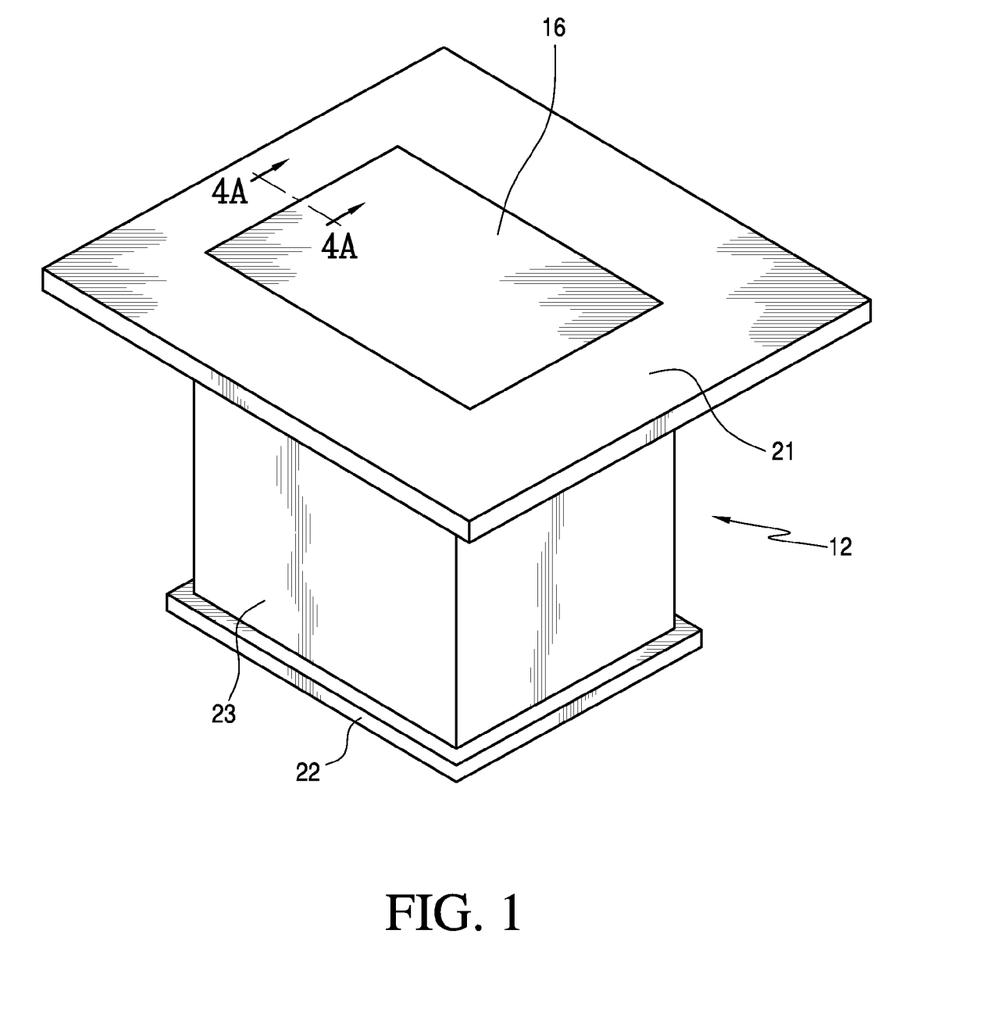
FIG. 1 is a perspective view showing one exemplary operable location of the present inflatable seal assembly.
Figure 2:
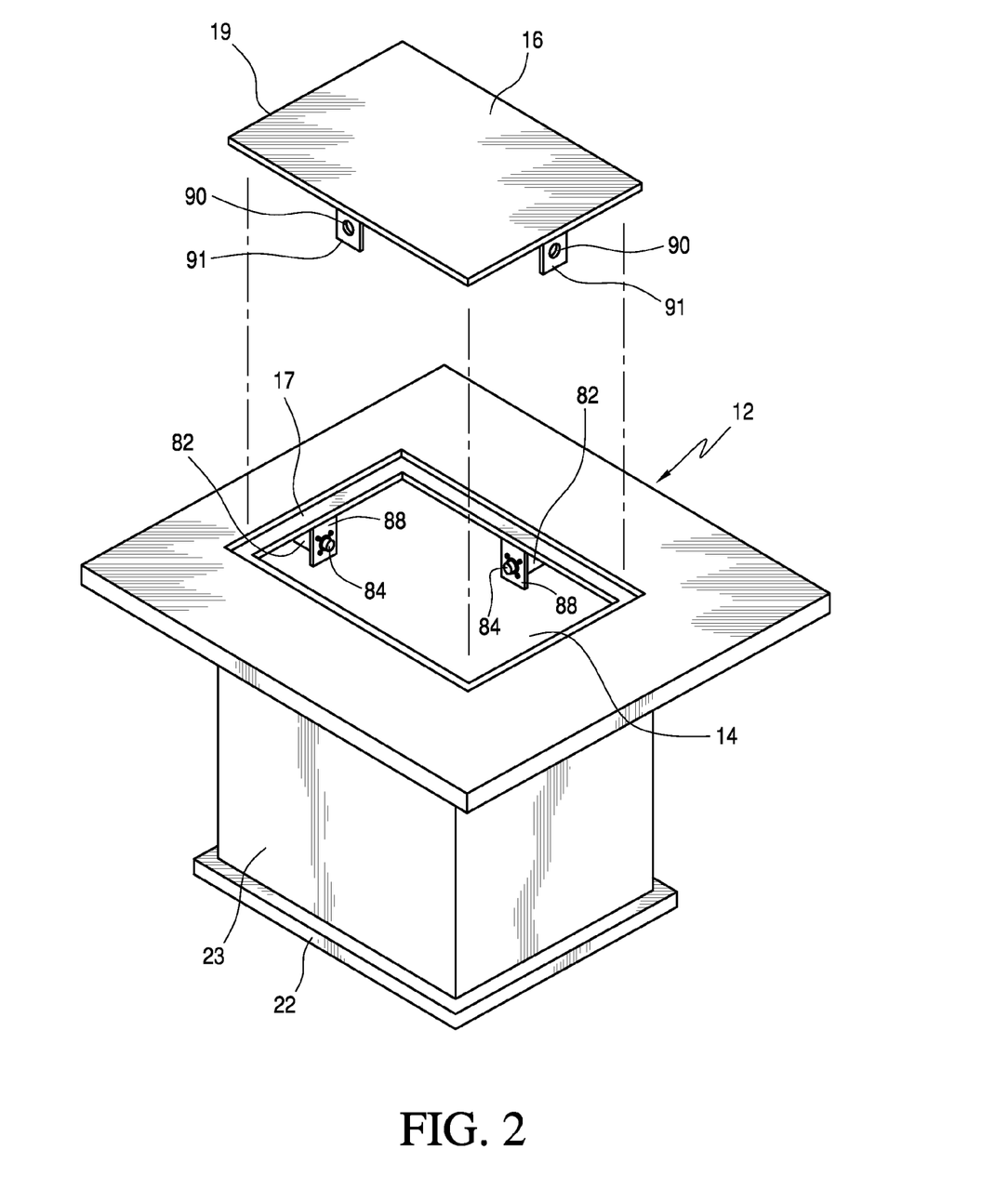
FIG. 2 is a perspective view showing the exemplary operable location of the present inflatable seal assembly of FIG. 1, showing the cover removed from an opening.
Figure 3:
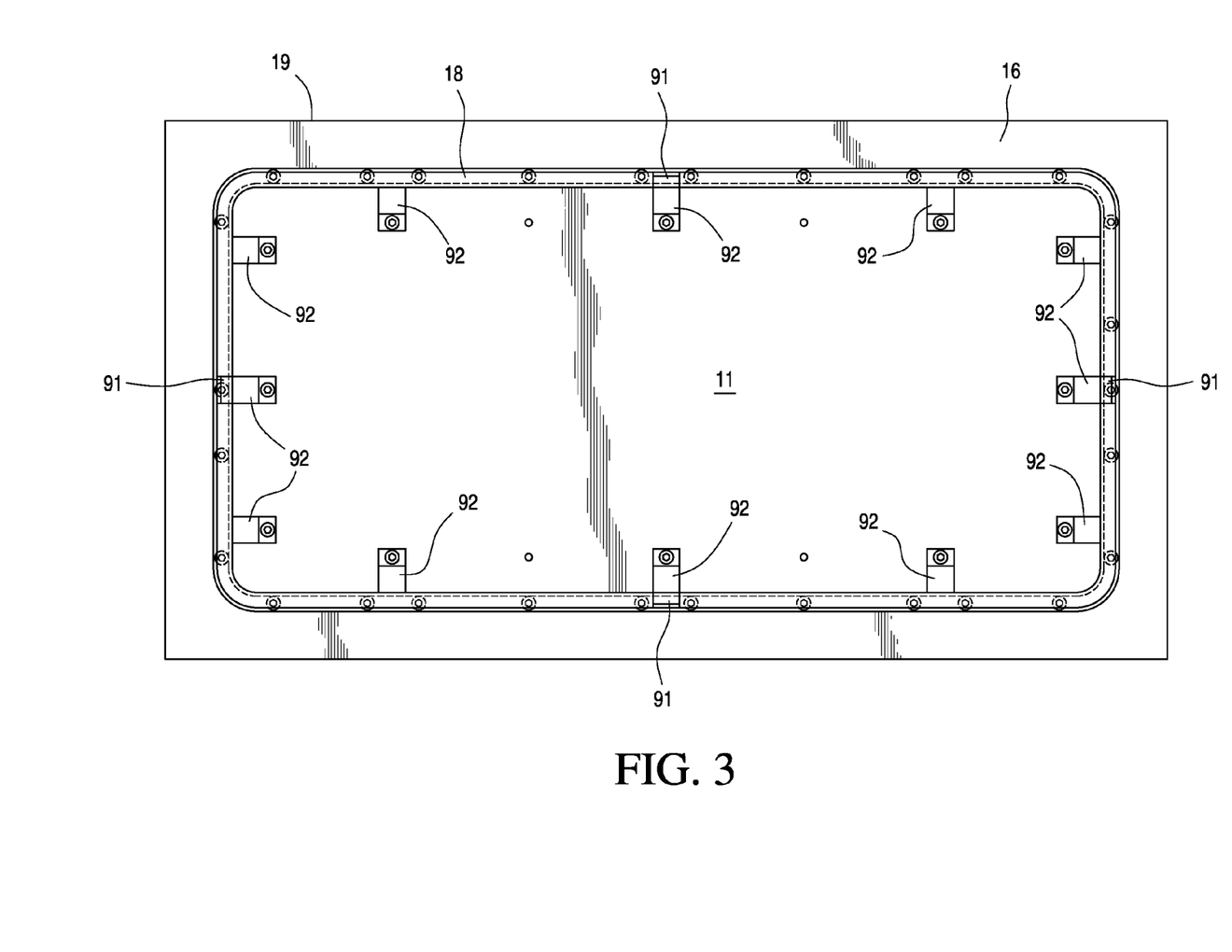
FIG. 3 is a top view of the cover showing an underneath portion of the cover having the inflatable seal assembly.

Referring to FIGS. 1 and 2, an inflatable seal assembly 10 is operably employed in a container 12 including an opening 14 which receives a cover 16. The inflatable seal assembly 10 can be implemented in any form of container having a cover requiring a seal between the cover and the container. Although an underground enclosure is shown in FIGS. 1 and 2, it should be appreciated that other applications of the seal assembly disclosed herein are contemplated, including but not limited to, sealing building openings such as windows and doors, sealing container openings having a cover, and sealing various types of vehicular windows and doors. The inflatable seal assembly 10 can be installed along an underneath portion 11 of an inner perimeter of the cover 16. Alternatively, the inflatable seal assembly 10 can be disposed along the perimeter of the opening 14. For example, the container 12 can include a collar 86 having a recessed ledge 17 arranged to receive a perimeter edge 19 of the cover 16, wherein the inflatable seal assembly 10 is disposed along a perimeter of the recessed ledge 17. In one configuration, the cover 16 is formed of a polymer concrete such as that produced by CDR Systems Corporation and lies coplanar to a top surface 21 of the container 12. The container 12 can include a base pad 22 forming the bottom of the container 12, which can be fabricated from a polymer concrete such as that produced by CDR Systems Corporation, and walls 23 secured to the base pad 22 that are generally fabricated from fiberglass.

Generally, as shown in FIGS. 3- 6, the inflatable seal assembly 10 includes a channel 18 and an inflatable seal 20. The inflatable seal 20 is secured in a temporarily fixed position via pins 58, 59 that are inserted through apertures 24, 25 in the channel 18.

More specifically, the channel 18 includes a closed end 26 and a pair of projecting legs 28, 30. By closed end 26, it is meant that the closed end 26 is integral to the pair of projecting legs 28, 30 providing an inner region 38 within the channel 18. In an embodiment of the invention, the channel 18 is formed into a unshaped configuration. In another embodiment of the invention, the channel 18 is formed into a c-shaped configuration. It should be apparent that the channel 18 can be roll-formed into other configurations as well. Preferably, rolled sheet metal is used to form the channel 18, as discussed in more detail below. The roll forming of the channel 18 provides radius corners 32. More preferably, a sheet metal having a uniform thickness of approximately 0.1345 inches can be used. The sheet metal can be made of aluminum, copper, brass, steel, nickel, titanium, tin, etc. A satisfactory material for fabrication of the channel is a 304 series stainless steel. In one configuration, the channel 18 width is approximately two inches, measured from one projecting leg 28 to the other projecting leg 30. The channel 18 height, measured from the closed end 26 to the projecting leg terminal ends 34, 36 is approximately one inch. More specifically, the projecting leg 28 is approximately one inch in height and the projecting leg 30 is approximately 0.914 inches in height. Thus, the projecting legs 28, 30 can be different heights to accommodate an angle of a confronting surface 31 of the container 12 and facilitate the installation of the channel 18. For example, a two degree angle of the confronting surface 31 can be accommodated by the projecting leg 28 having a height of approximately one inch and the projecting leg 30 having a height of approximately 0.914 inches, providing approximately a 13/64 inch clearance between the projecting leg 28 and the confronting surface 31 and approximately a 19/64 inch clearance between the projecting leg 30 and the confronting surface 31. However, it should be appreciated that the height variation of the projecting legs 28, 30 can be increased or decreased to accommodate a greater or smaller angle, respectively. The projecting legs 28, 30 are preferably disposed parallel to one another. It should be apparent by those having ordinary skill in the art that other channel sizes are possible, and are intended to be within the spirit and scope of the invention as claimed.

An interior region 38 of the channel 18 is sized to receive the inflatable seal 20. Preferably, the seal 20 includes a bulb 40, a foot 42 and a neck 44 intermediate the foot 42 and the bulb 40. The bulb 40, in one configuration, is inflatable to a pressure of approximately 25 psi. A satisfactory pneumatic seal is a fluroelastomer seal marketed under the trademark Presray Pneuma-Seal®, #PRS537, produced by Pawling Corporation of Pawling, N.Y. The bulb 40, in the deflated position 46, is elongated and entirely contained within the interior region 38 of the channel 18. In the inflated position 48, the bulb 40 is substantially annular and extends beyond the pair of projecting legs 28, 30 of the channel 18. In the inflated position 48, a portion of the outer circumference 50 of the inflated seal 20 is contiguous to the confronting surface 31, hindering entry of various states of matter into the container 12 and hindering the escape of various states of matter enclosed within the container 12. It should be appreciated that the outer circumference 50 of the inflated seal 20 does not need to be parallel to the confronting surface 31. That is, the inflated seal 20 can accommodate an angled confronting surface 31 such that the outer circumference 50 of the inflated seal 20 is still contiguous to the confronting surface 21. Since the inflated seal 20 and confronting surface 31 do not need to be parallel, economical fabrication processes are promoted, such as molding the collar 86 with an enhanced mold release process. For example, in one embodiment, the confronting surface 31 is a portion of a wall edge 51 of the collar 86 having a two degree draft angle. The foot 42 of the bulb 40 is preferably parallel to the closed end 26 of the channel 18. In one embodiment, a spacer 52 is positioned between the foot 42 and the closed end 26 of the channel 18. The spacer 52 can be fabricated from a Poron® silicone material and the like, and is rectangular in one configuration, wherein the width of the spacer is substantially the same or smaller than the width of the closed end 26 of the channel 18. Preferably, the spacer 52 width is also substantially the same as or greater than the width of the foot 42. Among other things, the spacer 52 ensures the seal 20 is fittingly engaged within the channel 18, wherein the thickness of the spacer 52 is increased or decreased as necessary.

Each of the projecting legs 28, 30 includes a plurality of apertures 24, 25 which are preferably spaced approximately six inches apart. However, the space between the apertures 24, 25 can be increased or decreased as necessary, as determined by a person having ordinary skill. The apertures 24 along projecting leg 28 and the apertures 25 along projecting leg 30 have common positions along the longitudinal axis 56. Preferably, the apertures 24, 25 are spaced from the closed end 26 by approximately 0.437 inches. However, the apertures 24, 25 can be closer or farther from the closed end 26 as necessary. In one configuration, the apertures 24, 25 in the projecting legs 28, 30 are approximately 0.219 inches in diameter.

Figure 6:
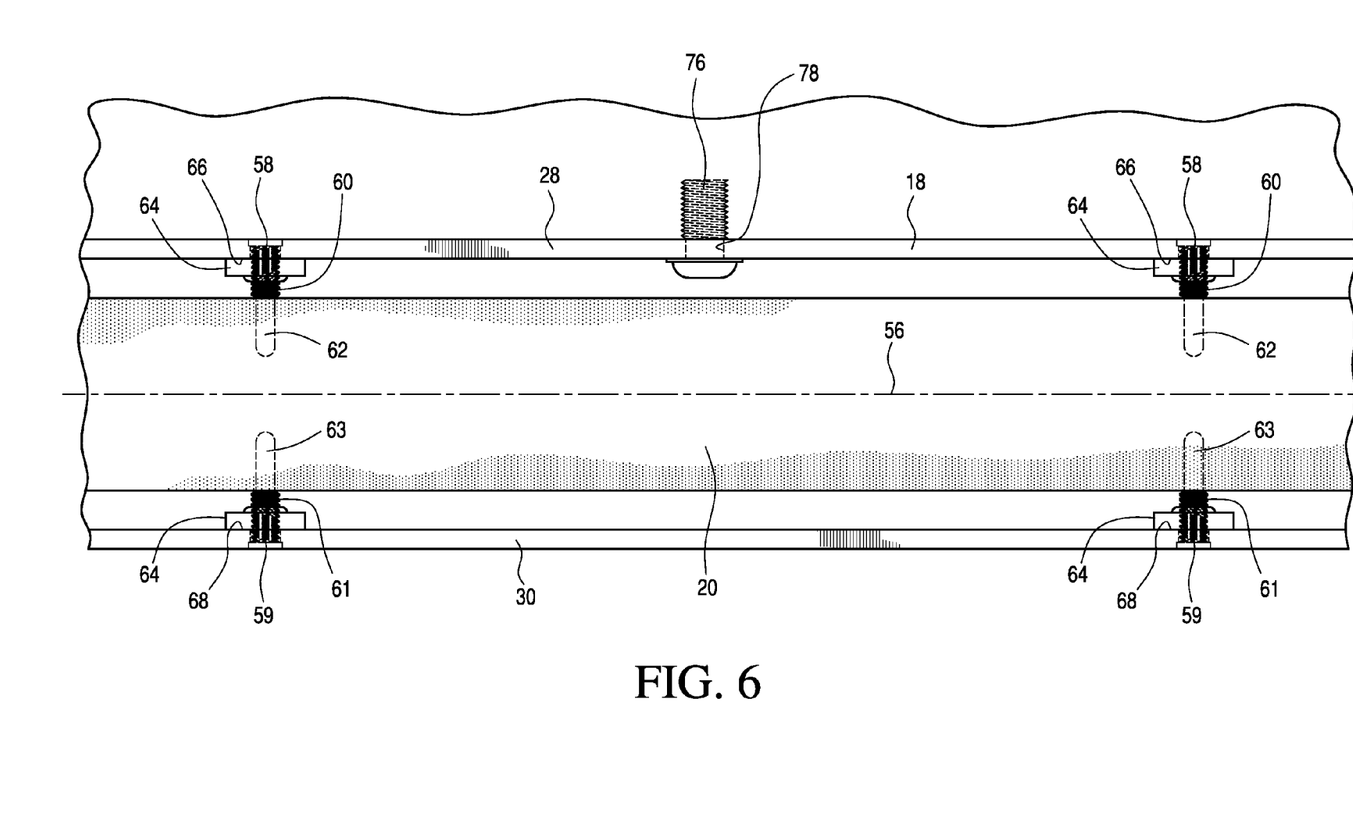
FIG. 6 is a front view of the inflatable seal assembly.
Figure 7:
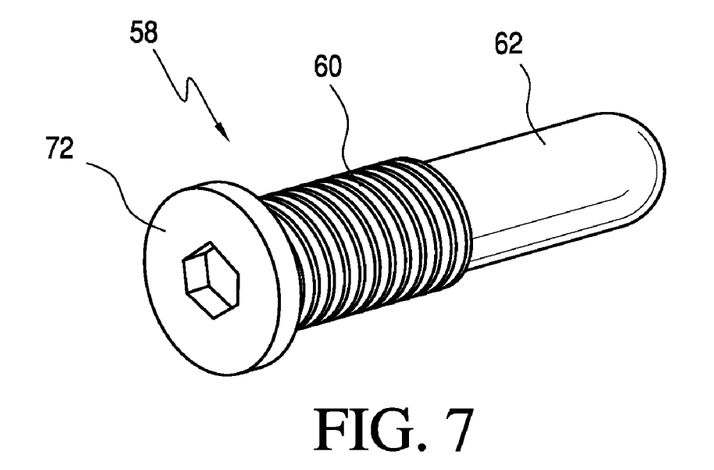
FIG. 7 is a perspective view of one of the plurality of pins.

The apertures 24, 25 are sized to receive pins 58, 59, as shown in FIGS. 6 and 7, each having a threaded portion 60, 61 and a non-threaded portion 62, 63. The pins 58, 59 are inserted into the apertures 24, 25 and the threaded portion 60, 61 of the pins 58, 59 each threadingly engage a nut 64 disposed on an inner surface 66, 68 of the projecting legs 28, 30 and align with the apertures 24, 25. The non-threaded portion 62, 63 of each pin 58, 59 projects towards the neck 44 of the seal 20 to dispose the foot 40 intermediate the pins 58, 59 and the closed end 26. An exemplary pin that can be used is a standard socket set screw fabricated from stainless steel. The threaded portion 60, 61 is arranged between the head 72 of the pin 58, 59 and the non-threaded portion 62, 63 of the pin 58, 59. In one configuration, the pins 58, 59 are approximately 0.750 inches in length, wherein the threaded portion 60, 61, including a head 72, is approximately 0.375 inches in length and the non-threaded portion 62, 63 is each approximately 0.375 inches in length. The head 72 has a thickness of approximately 0.09 inches. Preferably, the threaded portion 60, 61 includes a #8-32 thread having a major diameter of 0.164 inches and a minor diameter of 0.130 inches. The minor diameter of the non-threaded portion 62, 63 is approximately 0.125 inches. Preferably, each nut 64 includes a #8-32 female threaded portion 74 for engaging the threaded portion 60, 61 of the pins 58, 59. In one configuration, the pins 58 are permanently locked with a high-strength adhesive to the nut 64 by a thread locking material. For example, Loctite® 262 from the Henkel Corporation can be used to lock the threaded portion 60 of pin 58 to the nut 64. Preferably, Loctite® 242 from the Henkel Corporation, or a similar removable adhesive, is used to temporarily lock the pins 59 to the nut 64, thereby permitting removal of the pins 59 and replacement of the seal 20 after typical wear and tear over the years and/or puncturing.

Figure 8:
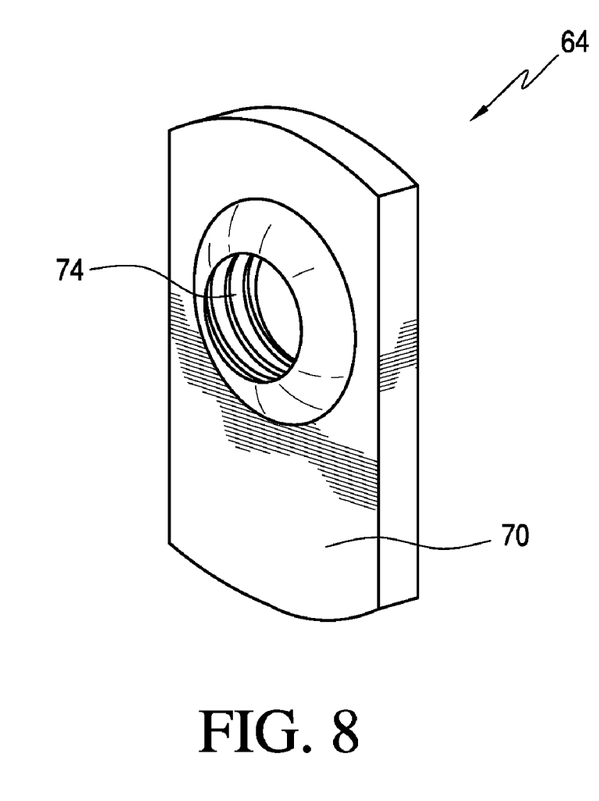
FIG. 8 is a perspective view of one of the plurality of weld nuts.

As shown in FIG. 8, the nut 64 preferably includes a welding tab 70 for spot welding the nut 64 to the interior surface 66, 68 of the projecting legs 28, 30. An exemplary nut 64 that can be used is the SNZ weld nut from the Ohio Nut and Bolt Company. It should be appreciated that other techniques can be used to secure the nut 64 to the channel 18, including but not limited to, using an adhesive to attached the nut 64. Further, it should be appreciated by those having ordinary skill that it is not required to fixedly secure the nut 64 to the channel 18 and this modification is intended to be within the spirit and scope of the invention as claimed.

It should be appreciated by those having ordinary skill in the art that the pins 58, 59 are spaced from the neck 44 of the seal 20. In one configuration, the pins 58, 59 are spaced approximately 0.03 inches from the neck 44. This reduces the risk of puncturing the inflatable seal 20 when the pins 58, 59 are inserted. Similarly, flat ended pins 58, 59 are preferred.

As seen in FIGS. 3- 6, the channel 18 can be secured to an underneath portion 11 of an inner perimeter of the cover 16. Preferably, bolts 76 secure the channel 18 to the cover 16. It should be appreciated, however, that other types of securing means can be used including screws, molly bolts, nails, etc. In one configuration, ⅜-16 inch bolts are used to secure the channel 18 to the cover 16. In one configuration, apertures 78 for receiving bolts 76 are formed in the channel 18 before inserting the bolts 76. Preferably, the bolts 76 are spaced more than six inches apart and more preferably, the bolts 76 are spaced approximately 10.5 inches apart. It should be apparent that the bolts 76 are spaced a distance from the pins 58, 59.

Figure 4A:
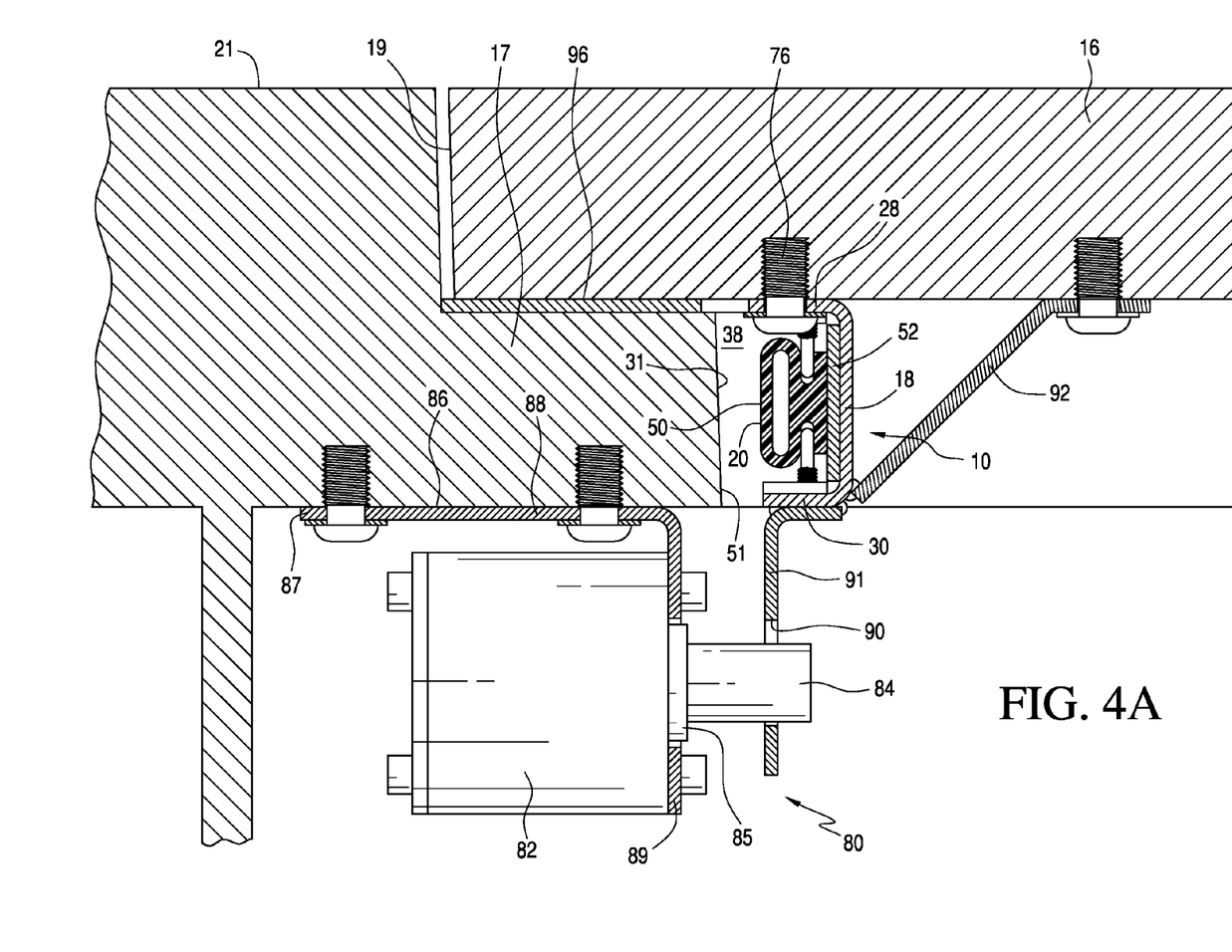
FIG. 4A is a cross-sectional view taken from lines 4A-4A of FIG. 1 showing a retention system for an inflatable seal.
Figure 4B:
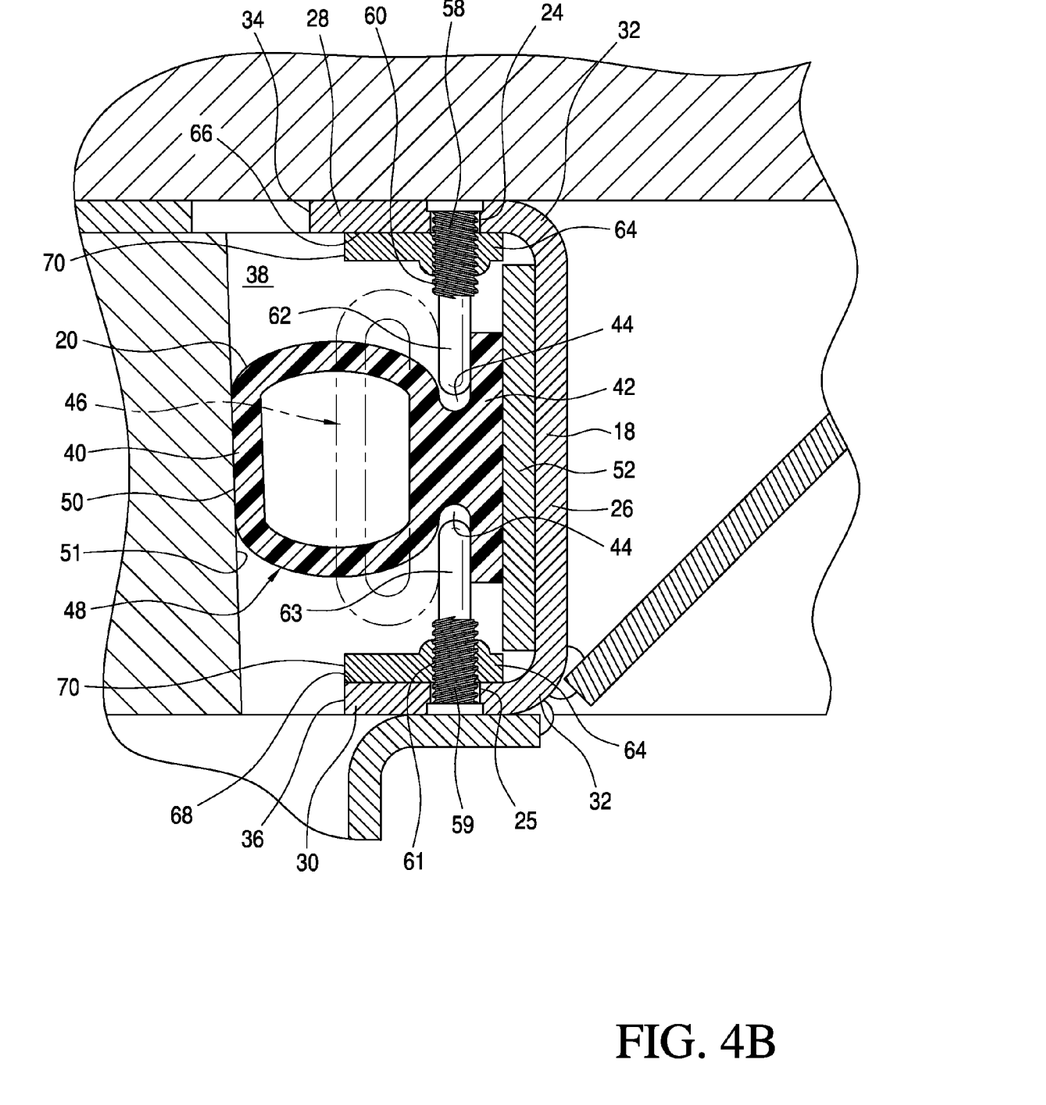
FIG. 4B is a partial-cross sectional view taken from lines 4A-4A of FIG. 1 showing the retention system for the inflatable seal.
Figure 5:
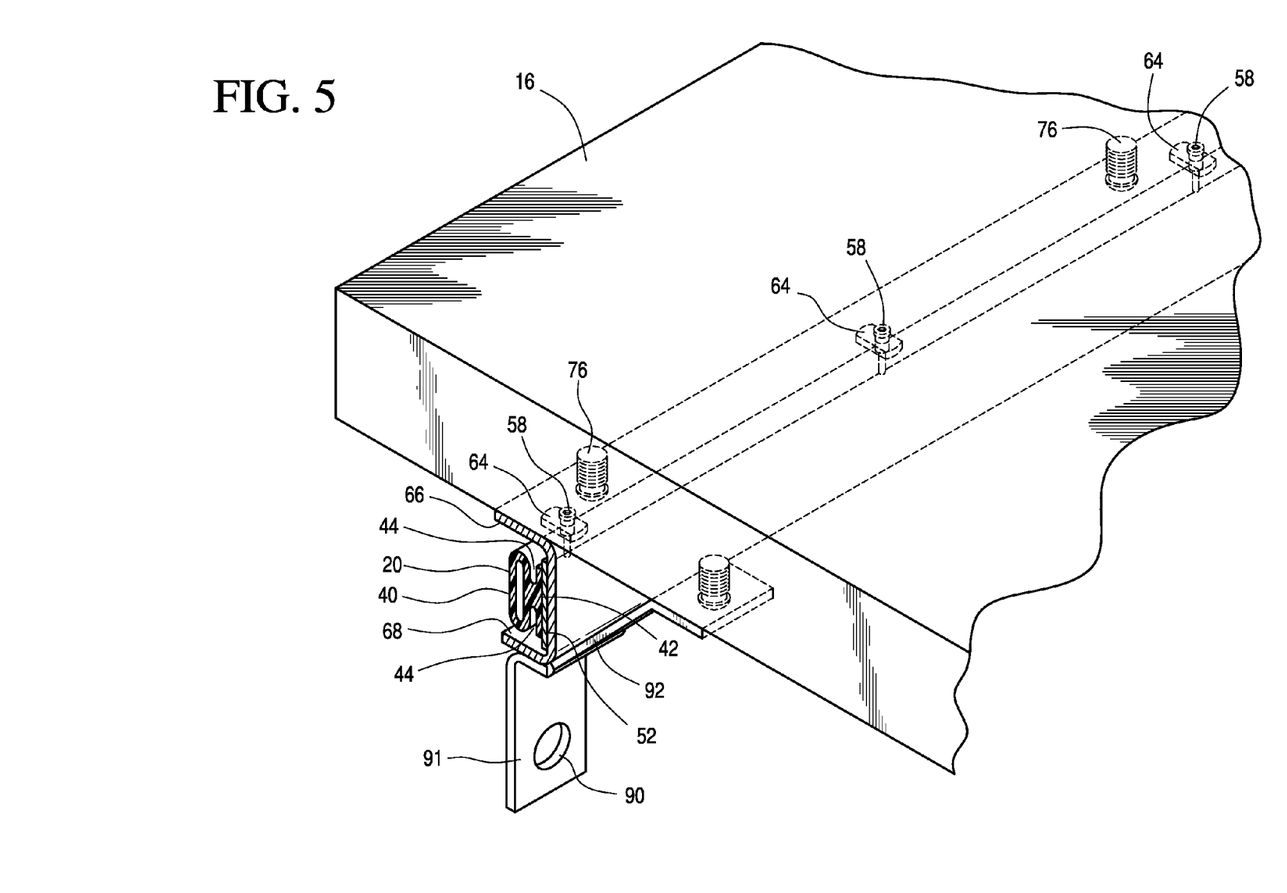
FIG. 5 is a partial-perspective view of the cover showing the retention system for the inflatable seal.

As shown in FIG. 4, a plurality of locking assemblies 80 is employed to releasably retain the cover 16. In one embodiment, the container 12 includes at least four locking assemblies 80. Each locking assembly 80 includes a pneumatic cylinder 82 which releases a piston 84 when the locking assembly 80 is engaged. The locking assemblies 80 are fluidly connected to an internal pressurized gas source and to the collar 86 of the container 12 by a bracket 88. In an embodiment of the invention, the bracket 88 is an L-shaped bracket having a first end 87 bolted to the collar 86 and a second end 89 for receiving the piston end 85 of the pneumatic cylinder 82. In the locked position, the piston 84 extends through an aperture 90 of the L-shaped bracket 91, which is connected to the cover 16 via an angle bracket 92 extending diagonally from the cover 16 to the channel 18. In an embodiment, the aperture 90 is approximately 1⅛ inches in diameter and the piston 84 is approximately ¾ inches in diameter. The piston 84 is off-set from the aperture 90 providing a self-centering arrangement. That is, the piston 84 is typically positioned approximately 0.06 inches from the top of the aperture 90 and 0.25 inches from the bottom of the aperture 90. Upon each locking assembly 80 engaging, each piston 84 will adjust within each aperture 90 as necessary to align the cover 16. Preferably, one end of the angle bracket 92 is bolted to the cover 16 and welded to the L-shaped bracket 91 and the channel 18. An additional spacer 96 can be disposed between the cover 16 and the recessed ledge 17. The spacer 96 can be fabricated from a Poron® silicone material and the like.

To retain the inflatable seal 20, the channel 18 is first formed by roll forming sheet metal to form a contoured metal channel having a uniform thickness. Preferably, the sheet metal is roll formed into a c-shaped configuration or a unshaped configuration having projecting legs 28, 30 and radius corners 32. Since roll forming typically requires sheet metal of at least 10 gauge, approximately 0.1345 inches thick or less, the channel 18 is substantially thinner than other types of channels typically used for such applications. Thus, the channel 18 cannot include threaded openings to threadingly engage the pins 58, 59. A plurality of the apertures 24, 25 are hole-punched into each projecting leg 28, 30. Preferably, each aperture 24 of the projecting legs 28 aligns with one of the apertures 25 of the projecting leg 30, wherein each aperture 24 has a common position with another aperture 25 along a longitudinal axis 56.

The nuts 64 are then disposed within the inner surface 66, 68 of the projecting legs 28, 30, wherein the female threaded portion 74 of the nut 64 aligns with the apertures 24, 25. In one configuration, the nuts 64 are spot welded to the inner surface 66, 68 of the projecting legs 28, 30. In another configuration, the nuts 64 are not secured to the inner surface 66, 68 of the projecting legs 28, 30 and are merely threadingly engaged to the pins 58, 59.

Next, the pins 58 along projecting leg 28 are inserted through the apertures 24 and threadingly engage the nuts 64. In a preferred embodiment, thread locking material is used on the threaded portion 60 of the pins 58 positioned within the nut 64 to fixedly secure the pins 58 therein. The channel 18 can then be secured to the cover 16 of the container 12 by bolts 76 or the like as discussed in more detail above. The seal 20, in the deflated position 46, is threaded into the channel 18, wherein the pins 58 disposed along the projecting leg 28 guide the seal 20 during insertion. Then, pins 59 are disposed along the projecting leg 30. The non-threaded portions 62, 63 of the pins 58, 59 are preferably aligned intermediate the inflatable bulb 40 and the foot 42. Preferably, the thread locking material is not used for pins 59 allowing the pins 59 to be removed in the event the seal 20 needs to be replaced. It should be appreciated by those having ordinary skill in the art that the pins 58, 59 remain spaced from the neck 44 of the inflated seal 20 to prevent puncturing. In one configuration, the terminal ends 34, 36 of the pins 58, 59 are approximately 0.03 inches from the neck 44 of the seal 20.

In an alternative embodiment of the invention, the channel 18 can be secured to the recessed ledge 17 of the housing by the bolts 76 before the pins 58, 59 or the seal 20 are inserted into the channel 18. The bolts 76 can also extend through the spacer 52, securing the channel 18 and the spacer 52 to the recessed ledge 17 of the container 12. In yet another configuration, the spacer 52 can be secured to the channel 18 alone, for example, by bolts, screws, rivets, adhesive, etc. Although the spacer 52 is shown in the figures, it should be appreciated by those having ordinary skill that the foot 42 can be fabricated with a wider base thereby disposing the foot 42 adjacent the channel 18 without the spacer 52. The seal 20, in the deflated position 46, is threaded into the channel 18, wherein the pins 58 or 59 are disposed along the projecting leg 28 or 30 to guide the seal 20 during insertion. Once the seal 20 is positioned within the channel 18, the other set of pins 58 or 59 is inserted into the apertures 24 or 25 along the other projecting leg 28 or 30.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

| Part No. | Part |
|---|---|
| 10 | inflatable seal assembly |
| 11 | underneath portion of cover |
| 12 | container |
| 14 | opening |
| 16 | cover |
| 17 | recessed ledge |
| 18 | channel |
| 19 | perimeter edge |
| 20 | inflatable seal |
| 21 | top surface |
| 22 | base pad |
| 23 | walls |
| 24, 25 | apertures |
| 26 | closed end |
| 28 | projecting leg |
| 30 | projecting leg |
| 31 | confronting surface |
| 32 | radius corner |
| 34 | projecting leg terminal end |
| 36 | projecting leg terminal end |
| 38 | interior region |
| 40 | bulb |
| 42 | foot |
| 44 | neck |
| 46 | deflated position |
| 48 | inflated position |
| 50 | outer circumference of inflated seal |
| 51 | wall edge of the container |
| 52 | spacer |
| 56 | longitudinal axis |
| 58, 59 | pins |
| 60, 61 | threaded portion |

-continued

| Part No. | Part |
|---|---|
| 62, 63 | non-threaded portion |
| 64 | nut |
| 66, 68 | inner surface |
| 70 | welding tab |
| 72 | head |
| 74 | female threaded portion |
| 76 | bolts |
| 78 | apertures |
| 80 | locking assemblies |
| 82 | pneumatic cylinder |
| 84 | piston |
| 85 | piston end |
| 86 | collar |
| 87 | first end of L-shaped bracket |
| 88 | bracket |
| 89 | second end of L-shaped bracket |
| 90 | aperture |
| 91 | L-shaped bracket |
| 92 | angle bracket |
| 96 | spacer |

The invention claimed is:

1. A method of retaining an inflatable seal comprising:
   forming a channel for receiving the inflatable seal having a foot, an inflatable bulb and a neck, the channel having a closed end and a pair of projecting legs;
   forming a plurality of spaced apertures in each of the projecting legs along a longitudinal axis of the channel, each of the plurality of spaced apertures of one of the projecting legs aligning with one of the plurality of spaced apertures of the other one of the projecting legs;
   inserting a spacer between the closed end of the channel and the foot of the inflatable seal;
   inserting a first set of pins into each of the plurality of spaced apertures of one of the projecting legs, each of the pins having a threaded portion and a non-threaded portion;
   threadingly engaging the threaded portion of the first set of pins with a first set of nuts, each of the nuts fixedly secured to an inner surface of one of the projecting legs;
   inserting the inflatable seal into the channel;
   aligning a portion of the neck of the inflatable seal with the non-threaded portions of the first set of pins;
   inserting a second set of pins into each of the plurality of spaced apertures of the other one of the projecting legs, each of the second set of pins having a threaded portion and a non-threaded portion;
   threadingly engaging the threaded portion of the second set of pins with a second set of nuts, each of the nuts fixedly secured to an inner surface of the other one of the projecting legs; and
   positioning the non-threaded portion of each of the first and second sets of pins towards the neck to dispose the foot intermediate the first and second sets of pins and the closed end, wherein the non-threaded portions of the first and second set of pins overlap at least half of the foot.

2. The method of claim 1, wherein forming the channel for receiving the inflatable seal includes rolling sheet metal into a c-shape.

3. The method of claim 1, wherein forming the channel for receiving the inflatable seal includes rolling sheet metal into a u-shape.

4. The method of claim 1, wherein forming the plurality of spaced apertures in the projecting legs of the channel includes hole-punching the plurality of apertures through the projecting legs.

5. The method of claim 1, wherein securing the plurality of nuts to the inner surface of the projecting legs of the channels further includes fixedly securing the plurality of nuts to an inner surface of the projecting legs by welding.

6. The method of claim 1, further comprising spacing the pins from the neck of the inflated seal.

7. The method of claim 1, further comprising fastening the channel to a cover after threadingly engaging the threaded portion of the first set of pins with the first set of nuts.

8. The method of claim 1, further comprising fastening the channel to a recessed ledge of an enclosure after threadingly engaging the threaded portion of the first set of pins with the first set of nuts.

9. An apparatus for retaining an inflatable seal comprising:
a channel having a closed end and a pair of projecting legs, each leg having a plurality of spaced apertures extending along a longitudinal axis of the channel;
a plurality of nuts aligned with the corresponding plurality of spaced apertures and fixedly secured to an inner portion of each of the projecting legs;
a seal disposed within the channel, the seal having an inflatable bulb, a foot and a neck intermediate the foot and the bulb;
a spacer disposed between the closed end of the channel and the foot of the inflatable seal; and
a pin disposed within each aperture, each of the pins having a threaded portion threadingly engaging one of the nuts and a non-threaded portion projecting towards the neck to dispose the foot intermediate the pin and the closed end, wherein the non-threaded portions of the pins overlap at least half of the foot.

10. The apparatus for retaining the inflatable seal of claim 9, wherein the channel is u-shaped.

11. The apparatus for retaining the inflatable seal of claim 9, wherein the channel is c-shaped.

12. The apparatus for retaining the inflatable seal of claim 9, wherein the projecting legs are disposed parallel to one another.

13. The apparatus for retaining the inflatable seal of claim 9, wherein the non-threaded portion of each of the pins is spaced from the neck of the inflatable seal.

14. The apparatus for retaining the inflatable seal of claim 9, wherein the channel is formed of rolled sheet metal.

15. The apparatus for retaining the inflatable seal of claim 9, wherein the plurality of nuts is welded to an inner surface of the projecting legs of the channel.

16. The apparatus for retaining the inflatable seal of claim 9, wherein the non-threaded portion of each of the pins is approximately $3/8^{th}$ inches in length.

17. The apparatus for retaining the inflatable seal of claim 9, wherein the threaded portion of each of the pins is approximately $3/8^{th}$ inches in length.

18. The apparatus for retaining the inflatable seal of claim 9, wherein each of the nuts includes a welding tab.

19. The apparatus for retaining the inflatable seal of claim 9, wherein the threaded portion of each of the pins has a minor diameter that is greater than a diameter of the non-threaded portion.

20. The apparatus for retaining the inflatable seal of claim 9, wherein each of the pins is a set screw spaced apart from each other by approximately six inches.

21. An apparatus for retaining an inflatable seal comprising:
a rolled sheet metal piece forming a channel for receiving the inflatable seal, the channel including a closed end and a pair of parallel projecting legs, wherein each projecting leg includes a plurality of spaced apertures;
a plurality of nuts, each having a tab and a threaded opening, wherein each of the tabs is welded to an inner surface of the projecting legs and wherein each of the threaded openings is aligned with the corresponding plurality of spaced apertures;
a seal disposed within the channel, the seal having an inflatable bulb, a foot and a neck intermediate the foot and the bulb;
a spacer disposed between the closed end of the channel and the foot of the seal; and
a pin disposed within each aperture, each pin having a threaded portion and a non-threaded portion, wherein the threaded portion of each pin threadingly engages one of the plurality of nuts, wherein the non-threaded portions of the pins overlap at least half of the foot and project towards the neck to dispose the foot intermediate the pins and the closed end, and wherein the non-threaded portion of each pin is spaced from the neck of the seal.

22. The apparatus for retaining an inflatable seal of claim 21, wherein one of the projecting legs has a height that is greater than the other one of the projecting legs.

23. The apparatus for retaining an inflatable seal of claim 21 further comprising at least one angle bracket having a first end fixedly secured to a cover and a second end fixedly secured to an outer portion of a bottom of the channel.

24. The apparatus for retaining an inflatable seal of claim 23 further comprising:
a locking mechanism having a piston; and
at least one L-shaped bracket mounted to an outer portion of one of the projecting legs of the channel and having an aperture for receiving the piston when the locking mechanism is engaged.

* * * * *